US012344537B2

(12) United States Patent
Shi et al.

(10) Patent No.: US 12,344,537 B2
(45) Date of Patent: Jul. 1, 2025

(54) METHOD FOR SYNTHESIZING A HYDROPHOBIC DEEP EUTECTIC SOLVENT

(71) Applicant: University of Kentucky Research Foundation, Lexington, KY (US)

(72) Inventors: Jian Shi, Lexington, KY (US); Wenqi Li, Lexington, KY (US); Jameson Hunter, Lexington, KY (US); Yuxuan Zhang, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 595 days.

(21) Appl. No.: 17/521,586

(22) Filed: Nov. 8, 2021

(65) Prior Publication Data

US 2022/0144669 A1   May 12, 2022

Related U.S. Application Data

(60) Provisional application No. 63/110,612, filed on Nov. 6, 2020.

(51) Int. Cl.
| | | |
|---|---|---|
| C08H 8/00 | (2010.01) | |
| B01D 11/04 | (2006.01) | |
| C02F 1/26 | (2023.01) | |
| C02F 101/30 | (2006.01) | |

(52) U.S. Cl.
CPC .......... C02F 1/26 (2013.01); *C02F 2101/30* (2013.01)

(58) Field of Classification Search
CPC ................. C02F 1/26; C02F 2101/30; B01D 11/04–0492; C08H 8/00
See application file for complete search history.

(56) References Cited

U.S. PATENT DOCUMENTS

| | | |
|---|---|---|
| 8,541,556 B1 | 9/2013 | Gu et al. |
| 8,759,049 B2 | 6/2014 | Pigeau et al. |
| 8,835,140 B2 | 9/2014 | Fernholz et al. |
| 8,951,960 B2 | 2/2015 | Wiatr et al. |
| 9,775,347 B2 | 10/2017 | Zhang |
| 9,790,520 B2 | 10/2017 | Semenza et al. |
| 10,723,859 B2 | 7/2020 | Shi et al. |
| 2003/0055007 A1 | 3/2003 | Sakuma |
| 2012/0207886 A1 | 8/2012 | Shulevitz et al. |
| 2013/0082003 A1 | 4/2013 | Bajpayee et al. |
| 2014/0045226 A1 | 2/2014 | Wicking et al. |
| 2015/0118726 A1 | 4/2015 | Wiatr et al. |
| 2019/0119704 A1 | 4/2019 | Fernholz et al. |
| 2020/0062681 A1 | 2/2020 | Singh et al. |
| 2021/0301249 A1 | 9/2021 | Shi et al. |
| 2021/0403346 A1 | 12/2021 | Shi et al. |

FOREIGN PATENT DOCUMENTS

| | | |
|---|---|---|
| CN | 106745443 B | 2/2018 |
| JP | 2000191520 A | 7/2000 |
| WO | WO 2009026706 A | 3/2009 |
| WO | WO2017013438 A1 | 1/2019 |
| WO | WO 2019083831 A1 | 5/2019 |
| WO | WO 2019121147 A1 | 6/2019 |
| WO | WO2019171312 A1 | 9/2019 |
| WO | WO 2020002008 A1 | 1/2020 |

OTHER PUBLICATIONS

Effective extraction of harmine by menthol/anise alcohol-based natural deep eutectic solvents, Y. Fan, et al., Separation and Purification Technology 250 (2020) 117211.*
Greener Terpene—Terpene Eutectic Mixtures as Hydrophobic Solvents, Martins et al., ACS Sustainable Chem. Eng. 2019, 7, 17414-17423 Downloaded via.*
Dwamena, Amos K., Recent Advances in Hydrophobic Deep Eutectic Solvents for Extraction, Separations 2019, 6, 9; pp. 1-15.
Gilmore, et al., Hydrophobic Deep Eutectic Solvents Incorporating Trioctylphosphine Oxide: Advanced Liquid Extractants, ACS Sustainable Chem. Eng. 2018, 6, 17323-17332.
Kim, et al., Supplemental Material, Biomass Pretreatment using Deep Eutectic Solvent from Lignin derived Phenols, 2018, Electronic Supplementary Material (ESI) for Green Chemistry, pp. 1-5, available at http://www.rsc.org/suppdata/c7/gc/c7gc03029k/c7gc03029k1.pdf (retrieved Jan. 4, 2022).
Kim, et al., Biomass Pretreatment using Deep Eutectic Solvent from Lignin Derived Phenols, 2018, Green Chemistry, pp. 1-8, available at https://www.researchgate.net/publication/322345426_Biomass_Pretreatment_using_Deep_Eutectic_Solvent_from_Lignin_derived_Phenols (retrieved Jan. 4, 2022).
Van Osch, D. J. G. P.; Zubeir, L. F.; van den Bruinhorst, A.; Rocha, M. A. A.; Kroon, M. C., Hydrophobic deep eutectic solvents as water-immiscible extractants. Green Chemistry 2015, 17 (9), 4518-4521.
Florindo, C.; Branco, L. C.; Marrucho, I. M., Development of hydrophobic deep eutectic solvents for extraction of pesticides from aqueous environments. Fluid Phase Equilibria 2017, 448, 135-142.
Cao, J.; Yang, M.; Cao, F.; Wang, J.; Su, E., Well-Designed Hydrophobic Deep Eutectic Solvents as Green and Efficient Media for the Extraction of Artemisinin from Artemisia annua Leaves. ACS Sustainable Chemistry & Engineering 2017, 5 (4), 3270-3278.
Van Osch, D. J. G. P.; Dietz, C. H. J. T.; van Spronsen, J.; Kroon, M. C.; Gallucci, F.; van Sint Annaland, M.; Tuinier, R., A Search for Natural Hydrophobic Deep Eutectic Solvents Based on Natural Components. ACS Sustainable Chemistry & Engineering 2019, 7 (3), 2933-2942.
Dodge, L. A. (2018). Fractionation of Lignin Derived Compounds From Thermochemically Processed Lignin Towards Antimicrobial Properties. (Year: 2018).
Sanchez-Maldonado, A. F., Schieber, A., & Ganzle, M. G. (2011 ). Structure-function relationships of the antibacterial activity of phenolic acids and their metabolism by lactic acid bacteria. Journal of applied microbiology, 111 (5), 1176-1184. (Year: 2011).
Espinoza-Acosta, J. L., Torres-Chavez, P. I., Ramfrez-Wong, B., Lopez-Saiz, C. M., & Montano-Leyva, B. (2016). Antioxidant, antimicrobial, and antimutagenic properties of technical lignins and their applications. Bio Resources, 11(2), 5452-5481. (Year. 2016.

(Continued)

*Primary Examiner* — Haidung D Nguyen
(74) *Attorney, Agent, or Firm* — Stites & Harbison PLLC; Gary N. Stewart; Mandy Wilson Decker

(57) ABSTRACT

A method for synthesizing a hydrophobic deep eutectic solvent (DES) using one or more lignin-derived compounds is provided.

19 Claims, 2 Drawing Sheets

(56) References Cited

OTHER PUBLICATIONS

Srinivasulu, Cheemanapalli, et al. "Syringic acid (SA)—a review of its occurrence, biosynthesis, pharmacological and industrial importance." Biomedicine & Pharmacotherapy 108 (2018): 547-557. (Year: 2018).
Suzuki, H., Mori, R., Kato, M., & Shimizu, M. (2022). Biochemical characterization of hydroquinone hydroxylase from Phanerochaete chrysosporium. Journal of Bioscience and Bioengineering. (Year: 2022).
Salvachua, D., Katahira, R., Cleveland, N. S., Khanna, P., Resch, M. G., Black, B. A., . . . & Beckham, G. T. (2016). Lignin depolymerization by fungal secretomes and a microbial sink. Green Chemistry, 18(22), 6046-6062. (Year: 2016).
(NIST)National Institute of Standards and Technology. (2021). Benzoic acid, 4-hydroxy-3,5-dimethoxy. Benzoic acid, 4-hydroxy-3,5-dimethoxy—Retrieved on Dec. 14, 2022 from(https://webbook.nist.gov/cgi/inchi/InChI%3D1S/C9H10O5/c1-13-6-3-5(9(11)12)4-7(14-2)8 (6)1 0/h3-4%2C10H%2C1-2H3%2C(H%2C11 %2C12) (Year: 2021).
Haris, et al., Natural Antibacterial Agents from Arid-region Pretreated Lignocellulosic Biomasses and extracts for the Control of Lactic Acid Bacteria in Yeast Fermentation, 2018.
Alzagameen et al., Antimicrobial Activity of Lignin and Lignin-Derived Cellulose and Chitosan Composites Against Selected Pathogenic and Spoilage Microorganisms, 2019.
Yang et al., Effect of Cellulose and Lignin on Disintegration, Antimicrobial and Antioxidant Properties of PLA Active Films, 2016.
Garcia, et al., Antioxidant and Biocide Behaviour of Lignin Fractions from Apple Tree Pruning Residues, 2017.
Gu et al., Physiological Mechanism of Improved Tolerance of *Saccharomyces cerevisiae* to Lignin-Derived Phenolic Acids in Lignocellulosic Ethanol Fermentation by Short-Term Adaptation, 2019.
Chang et al., Use of Sulfite and Hydrogen Peroxide to Control Bacterial Contamination in Ethanol Fermentation, 1997.
Van der Pol et al., Identifying Inhibitory Effects of Lignocellulosic By-products on Growth of Lactic Acid Producing Micro-organisms using a Rapid Small-Scale Screening Method, 2016.
Mintenig, S. M.; Bäuerlein, P. S.; Koelmans, A. A.; Dekker, S. C.; van Wezel, A. P., Closing the gap between small and smaller: towards a framework to analyse nano- and microplastics in aqueous environmental samples. Environmental Science: Nano 2018, 5 (7), 1640-1649.
Nguyen, B.; Claveau-Mallet, D.; Hernandez, L. M.; Xu, E. G.; Farner, J. M.; Tufenkji, N., Separation and Analysis of Microplastics and Nanoplastics in Complex Environmental Samples. Accounts of Chemical Research 2019, 52 (4), 858-866.
Li, et al., Hydrophobic deep eutectic solvents as extractants for the determination of bisphenols from food-contacted plastics by high performance liquid chromatography with fluorescence detection, Journal of Chromatography A, 2020.
Makos, et al., Hydrophobic Deep Eutectic Solvents in Microextraction Techniques—A Review, Published Article in Microchemical Journal—Oct. 2019 (Year: 2019).
Qu et al., Synthesis and Characterization of Deep Eutectic Solvents (five hydrophilic and three hydrophobic), and hydrophobic application for microextraction of environmental water samples, Published in Analytical and Bioanalytical Chemistry, 2019, vol. 411, pp. 7489-7498 (Year: 2019).
Paiva, et al., Natural Deep Eutectic Solvents-Solvents for the 21st Century, Published in American Chemical Society Sustainable Chemical Engineering, vol. 2, pp. 1063-1071 (Year: 2014).
USPTO, Non-Final Office Action for U.S. Appl. No. 17/362,515 dated Mar. 6, 2023.
USPTO, Non-Final Office Action for U.S. Appl. No. 17/219,111 dated Dec. 28, 2022.
Bischoff, et al., Modeling Bacterial contamination of Fuel Ethanol Fermentation, Biotechnology and Bioengineering, vol. 103, No. 1, May 1, 2009, pp. 117-122.
Ma, R., et al., Peracetic Acid Depolymerization of Biorefinery Lignin for Production of Selective Monomeric Phenolic Compounds. Chemistry—A European Journal, 2016. 22(31): p. 10884-10891.
Anderson, E.M., Katahira, R., Reed, M., Resch, M. G., Karp, E. M., Beckham, G. T., & Roman-Leshkov, Y. (2016). Reductive catalytic fractionation of corn stover lignin. ACS Sustainable Chemistry & Engineering, 4(12), 690-6950. (Year: 2016).
Sun (2000). Delignification of maize stems by peroxymonosulfuric acid, peroxyformic acid, peracetic acid, and hydrogen peroxide. 1. physiochemical and structural characterization of the solubilized lignins. Journal of agricultural and food chemistry, 48(4), 1253-1262. (Year: 2000).
Shinohara, T., Kubodera, S., & Yanagida, F. (2000). Distribution of phenolic yeasts and production of phenolic off-flavors in wine fermentation. Journal of Bioscience and Bioengineering, 90(1), 90-97 (Year: 2000).
Chen, Mingji, Yan Li, Huiming Liu, Dandan Zhang, Qing-Shan Shi, Xin-Qi Zhong, Yanzhu Guo, and Xiao-Bao Xie. "High value valorization of lignin as environmental benign antimicrobial." Materials Today Bio 18 (2023): 100520. (Year: 2023).
Zemek J, Kosikova B, Augustin J, Joniak D. Antibiotic properties of lignin components. Folia Microbiol (Praha). 1979; 24(6): 483-6. doi: 10.1007/BF02927180. PMID 389763. (Year: 1979).
Kalinoski, et al. (2020). Antimicrobial properties of corn stover lignin fractions dervied from catalytic transfer hydrogenolysis in supercritical ethanol with a Ru/C catalyst. ACS Sustainable Chemistry & Engineering, 8(50), 1 (Year: 2020).
Kai, D., Tan, M. J., Chee, P. L., Chua, Y. K., Yap, Y.L., & Loh, X. J. (2016). Towards lignin-based functional materials in a sustainable world. Green Chemistry, 18(5), 1175-1200 (Year: 2016).
Yan, Z., Gao, X., Gao, Q., & Bao, J. (2019). Mechanism of tolerance to the lignin-derived inhibitor p-benzoquinone and metabolic modification of biorefinery strains. Applied and environmental microbiology, 85(22), e01443-19 (Year: 2019).
Dong, X., dong, M., Lu, Y., Turley, A., Jin, T., & Wu, C. (2011). Antimicrobial and antioxidant activities of lignin from residue of corn stover to ethanol production. Industrial Crops and Products, 34(3), 1629-1634. (Year: 2011).
Pittet, V., Morrow, K., & Ziola, B. (2011). Ethanol tolerance of lactic acid bacteria, including relevance of the exopolysaccharide gene gtf. Journal of the American Society of Brewing Chemists, 69(1), 57-61. (Year: 2011).
Lam, T. B. T., Kadoya, K., & Iiyama, K. (2001). Bonding of hydroxycinnamic acids to lignin: ferulic and p-coumaric acids are predominantly linked at the benzyl position of lignin, not the B-position, in grass cell walls. Phytochemistry, 57(6), 987-992. (Year: 2001).
Jabri-Karoui, I., & Marzouk, B. (2014). Biactive compounds, antioxidant activities and heat stability of corn oil enriched with Tunisian *Citrus aurantium* L. peel extract. Journal of the American Oil Chemists' Society, 91, 1367-1375. (Year: 2014).
Renders, T., Van den Bossche, G., Vangeel, T., Van Aelst, K., & Seals, B. (2019). Reductive catalytic fractionation: state of the art of the lignin-first biorefinery. Current opinion in biotechnology, 56, 193-201 (Year: 2019).
USPTO, Final Office Action for U.S. Appl. No. 17/219,111 dated Jun. 23, 2023.
USPTO, Non-Final Office Action for U.S. Appl. No. 17/219,111 dated Jan. 30, 2024.
USPTO, Non-Final Office Action for U.S. Appl. No. 17/219,111 dated Jun. 27, 2024.
USPTO, Non-Final Office Action for U.S. Appl. No. 17/219,111 dated Nov. 13, 2024.

\* cited by examiner

METHOD FOR SYNTHESIZING A HYDROPHOBIC DEEP EUTECTIC SOLVENT

RELATED APPLICATIONS

This application claims the benefit of U.S. Provisional Patent Application Ser. No. 63/110,612, filed Nov. 6, 2020, the entire of disclosure of which is incorporated herein by this reference.

GOVERNMENT INTEREST

This invention was made with government support under grant number 1015068 awarded by the United States Department of Agriculture (USDA). The government has certain rights in the invention.

TECHNICAL FIELD

The presently disclosed subject matter is directed to a method of synthesizing a deep eutectic solvent (DES). More particularly, the presently disclosed subject matter is directed to a method of synthesizing a hydrophobic DES using one or more lignin-derived compounds.

BACKGROUND

Long-time human activities have led to the widespread deposit of plastic debris into the global aqueous system. Accumulation of micro- and nano-scale plastic particles (i.e., "microplastics" and "nanoplastics," respectively) is the subject of increasing concern as their small size makes them hard to remediate using traditional methods. Nanoplastics refer to nanoscale plastic particles composed of organic polymers, such as polystyrene, polyethylene, and polyethylene terephthalate (PET). Their size can range from a few nanometers to hundreds of nanometers. Nanoplastics can be generated through various paths, such as through the mechanical and chemical degradation of plastic wastes widely used for personal and industrial activities. Prior research has identified the presence of nanoplastics within various aqueous systems, including seawater and drinking water. The small size of nanoplastics could make them impact the ecosystem differently from the micro- and macro-plastics. With sizes similar or even smaller than a cell, nanoplastics can penetrate the natural barriers of plants, animals, and humans and thus affect the biological functions of the same. Although the interaction between nanoplastics and ecosystems and the mode of action are still an active area of research, recent studies have revealed that nanoplastics can potentially change the metabolism of human lung cells and significantly decrease the rate of fertilization success of oysters.

As noted in co-pending and commonly assigned U.S. patent application Ser. No. 17/362,515, which is incorporated herein by reference, hydrophobic DESs can prove useful in extracting plastic contaminates from contaminated water samples. It is appreciated however, that the benefits and utility of hydrophobic DESs are not limited to such application. Rather, the advantages of hydrophobic DESs including simple synthesis procedures, low volatility, biocompatibility, and sustainability generally make hydrophobic DESs a greener alternative to many conventional organic solvents that are toxic and volatile for the separation of substances from aqueous phase. Accordingly, hydrophobic DESs may thus find use in a wide variety of applications and environments. In addition, natural or biomass-derived compounds, such as lignin-derived phenols, can be used as the precursors for DESs preparation, which also makes the synthesis of such hydrophobic DESs more environmentally friendly and cost-effective.

Accordingly, additional methods for synthesizing hydrophobic DESs which utilize lignin-derived compounds would thus be beneficial and desirable.

SUMMARY

This Summary describes several embodiments of the presently-disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this Summary or not. To avoid excessive repetition, this Summary does not list or suggest all possible combinations of such features.

The presently disclosed subject matter is directed to a method of synthesizing a deep eutectic solvent (DES). More particularly, the presently disclosed subject matter is directed to a method of synthesizing a hydrophobic DES using one or more lignin-derived compounds.

In one aspect, the presently disclosed subject matter is directed to a method of synthesizing a hydrophobic DES, which utilizes a first lignin-derived compound and a second lignin-derived compound. In the method, a hydrophobic DES is synthesized by initially mixing the first lignin-derived compound with a second lignin-derived compound that is different than the first lignin-derived compound to create a mixture. The resulting mixture is subsequently heated and stirred until a homogenous liquid is obtained, which results in the synthesis of the hydrophobic DES.

In some embodiments, the first lignin-derived compound and/or the second lignin-derived compound is aromatic. In one such embodiment, the first lignin-derived compound and/or the second lignin-derived compound are selected from: thymol; 2,6-dimethoxyphenol; vanillin; phenol; 1-phenylethanol; guaiacol; and 4-hydroxybenzyl alcohol. In another such embodiment, both the first lignin-derived compound and the second lignin-derived compound are aromatic.

In some embodiments, the first lignin-derived compound and/or the second lignin-derived compound is phenolic. In one such embodiment, the first lignin-derived compound and/or the second lignin-derived compound is selected from: thymol; 2,6-dimethoxyphenol; vanillin; phenol; guaiacol; and 4-hydroxybenzyl alcohol. In some embodiments, both the first lignin-derived compound and the second lignin-derived compound are phenolic.

In some embodiments, the first lignin-derived compound and the second lignin-derived compound are each a monocyclic compound including at least one hydroxyl group attached to a ring structure of the monocyclic compound. In some embodiments, at least one of the first lignin-derived compound and the second lignin-derived compound is a terpenoid.

In some embodiments, the first lignin derived-compound is aromatic and the second lignin-derived compound is a cyclic compound including at least one hydroxyl group attached to a ring structure of the cyclic compound, where the first lignin-derived compound and the second lignin-derived compound are not the same compound. In one such embodiment, the first lignin-derived compound is selected from: thymol; 2,6-dimethoxyphenol; vanillin; phenol; 1-phenylethanol; guaiacol; and 4-hydroxybenzyl alcohol. In another such embodiment, the second lignin-derived compound is aromatic. In some embodiments, the cyclic compound used as the second lignin-derived compound is a monocyclic compound. In some embodiments, the cyclic compound used as the second lignin-derived compound is a terpenoid. In some embodiments, the terpenoid is selected from menthol and thymol.

In some embodiments, the mixture created by mixing the first lignin-derived compound and the second lignin-derived compound is heated so that the temperature of the mixture is increased to a value of about 40° C. to about 120° C. In some embodiments, the mixture created from the first lignin-derived compound and the second lignin-derived compound is heated so that the temperature of the mixture is increased to a value of about 60° C. to about 100° C. In some embodiments, the first lignin-derived compound and the second lignin-derived compound may be mixed in a molar ratio of about 1:1, about 1:2, about 2:1, about 3:1, about 4:1, or about 5:1.

In another aspect, the presently disclosed subject matter is directed to a method of synthesizing a hydrophobic DES, which utilizes only a single lignin-derived compound. In such embodiments, instead of utilizing a second lignin-derived compound within the mixture that is subsequently heated and stirred to synthesize the hydrophobic DES, a fatty acid which includes at least one carboxyl group may be utilized. In some embodiments, the mixture is created by mixing a lignin-derived compound with a decanoic acid.

BRIEF DESCRIPTION OF THE DRAWINGS

The presently-disclosed subject matter will be better understood, and features, aspects and advantages other than those set forth above will become apparent when consideration is given to the following detailed description thereof. Such detailed description makes reference to the following drawings, wherein:

FIG. 1A shows phase separation of water and a hydrophobic DES synthesized from menthol and 2,6-dimethoxyphenol (1:1 molar ratio). FIG. 1B shows phase separation of water and a hydrophobic DES synthesized from menthol and 2,6-dimethoxyphenol (1:2 molar ratio). FIG. 1C shows phase separation of water and a hydrophobic DES synthesized from menthol and 2,6-dimethoxyphenol (2:1 molar ratio). FIG. 1D shows phase separation of water and a hydrophobic DES synthesized from menthol and phenol (1:1 molar ratio). FIG. 1E shows phase separation of water and a hydrophobic DES synthesized from menthol and phenol (1:2 molar ratio). FIG. 1F shows phase separation of water and a hydrophobic DES synthesized from menthol and phenol (2:1 molar ratio). FIG. 1G shows phase separation of water and a hydrophobic DES synthesized from menthol and 1-phenylethanol (1:1 molar ratio). FIG. 1H shows phase separation of water and a hydrophobic DES synthesized from menthol and guaiacol (1:1 molar ratio).

FIG. 2A shows phase separation of water and a hydrophobic DES synthesized from thymol and vanillin (1:1 molar ratio). FIG. 2B shows phase separation of water and a hydrophobic DES synthesized from thymol and 2,6-dimethoxyphenol (1:1 molar ratio). FIG. 2C shows phase separation of water and a hydrophobic DES synthesized from thymol and 2,6-dimethoxyphenol (1:2 molar ratio). FIG. 2D shows phase separation of water and a hydrophobic DES synthesized from thymol and 2,6-dimethoxyphenol (2:1 molar ratio). FIG. 2E shows phase separation of water and a hydrophobic DES synthesized from thymol and phenol (1:1 molar ratio). FIG. 2F shows phase separation of water and a hydrophobic DES synthesized from thymol and phenol (1:2 molar ratio). FIG. 2G shows phase separation of water and a hydrophobic DES synthesized from thymol and phenol (2:1 molar ratio). FIG. 2H shows phase separation of water and a hydrophobic DES synthesized from thymol and guaiacol (1:1 molar ratio).

FIG. 3A shows phase separation of water and a hydrophobic DES synthesized from decanoic acid and 2,6-dimethoxyphenol (1:1 molar ratio). FIG. 3B shows phase separation of water and a hydrophobic DES synthesized from decanoic acid and 2,6-dimethoxyphenol (1:2 molar ratio). FIG. 3C shows phase separation of water and a hydrophobic DES synthesized from decanoic acid and 2,6-dimethoxyphenol (2:1 molar ratio). FIG. 3D shows phase separation of water and a hydrophobic DES synthesized from decanoic acid and phenol (1:1 molar ratio). FIG. 3E shows phase separation of water and a hydrophobic DES synthesized from decanoic acid and phenol (1:2 molar ratio). FIG. 3F shows phase separation of water and a hydrophobic DES synthesized from decanoic acid and phenol (2:1 molar ratio). FIG. 3G shows phase separation of water and a hydrophobic DES synthesized from decanoic acid and guaiacol (1:1 molar ratio). FIG. 3H shows phase separation of water and a hydrophobic DES synthesized from decanoic acid and 1-phenylethanol (1:1 molar ratio).

FIG. 4A shows phase separation of water and a hydrophobic DES synthesized from 2,6-dimethoxyphenol and 4-hydroxybenzyl alcohol (1:1 molar ratio). FIG. 4B shows phase separation of water and a hydrophobic DES synthesized from 2,6-dimethoxyphenol and 4-hydroxybenzyl alcohol (2:1 molar ratio). FIG. 4C shows phase separation of water and a hydrophobic DES synthesized from 2,6-dimethoxyphenol and 4-hydroxybenzyl alcohol (3:1 molar ratio). FIG. 4D shows phase separation of water and a hydrophobic DES synthesized from 2,6-dimethoxyphenol and 4-hydroxybenzyl alcohol (4:1 molar ratio). FIG. 4E shows phase separation of water and a hydrophobic DES synthesized from 2,6-dimethoxyphenol and 4-hydroxybenzyl alcohol (5:1 molar ratio). FIG. 4F shows phase separation of water and a hydrophobic DES synthesized from 2,6-dimethoxyphenol and vanillin (1:1 molar ratio). FIG. 4G shows phase separation of water and a hydrophobic DES synthesized from 2,6-dimethoxyphenol and vanillin (2:1 molar ratio). FIG. 4H shows phase separation of water and a hydrophobic DES synthesized from 2,6-dimethoxyphenol and phenol (1:1 molar ratio). FIG. 4I shows phase separation of water and a hydrophobic DES synthesized from 2,6-dimethoxyphenol and vanillin (1:2 molar ratio). FIG. 4J shows phase separation of water and a hydrophobic DES synthesized from 2,6-dimethoxyphenol and vanillin (2:1 molar ratio).

DESCRIPTION OF EXEMPLARY EMBODIMENTS

Figures 1A, 1B, 1C, 1D, 1E, 1F, 1G, 1H:
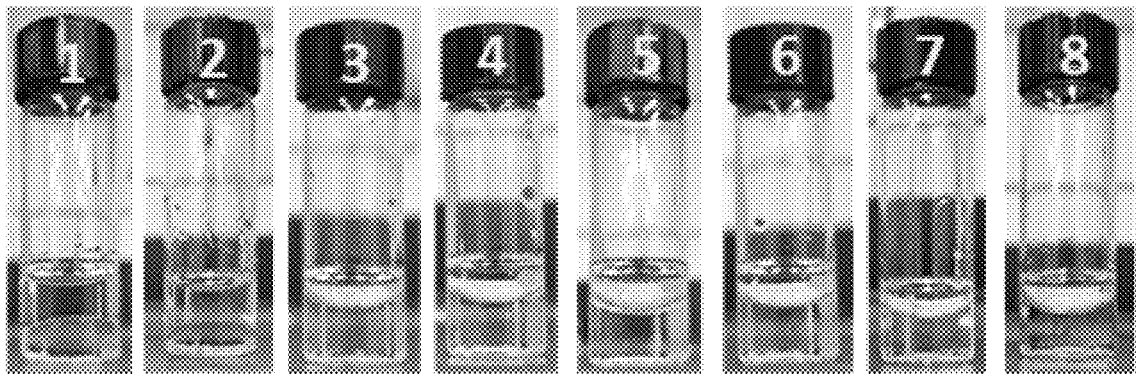
FIGS. 1A-H are various images showing a phase separation of water and a hydrophobic deep eutectic solvent (DES) synthesized from a first lignin-derived compound and a second lignin-derived compound, in which one of the lignin-derived compounds is menthol.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

Unless defined otherwise, all technical and scientific terms used herein have the same meaning as commonly understood by one of ordinary skill in the art to which the disclosure belongs. Any methods and materials similar to or equivalent to those described herein can be used in the practice or testing of the present disclosure, including the methods and materials described below.

Following long-standing patent law convention, the terms "a," "an," and "the" refer to "one or more" when used in this application, including the claims. Thus, for example, reference to "a cell" includes a plurality of cells, and so forth.

The terms "comprising," "including," and "having" are intended to be inclusive and mean that there may be additional elements other than the listed elements.

As used herein, the terms "optional" or "optionally" means that the subsequently described event or circumstance can or cannot occur, and that the description includes instances where said event or circumstance occurs and instances where it does not.

As used herein, the term "lignin-derived compound" means a compound which is either directly extracted from the lignin component of a lignocellulosic biomass or obtained directly from the lignin component of a lignocellulosic biomass by mechanically and/or chemically treating the lignocellulosic biomass, or which is synthesized from an intermediate compound that is directly extracted or obtained from the lignin component of a lignocellulosic biomass, such as m-Cresol and/or acetophenone.

Unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration, percentage, or the like is meant to encompass variations of in some embodiments ±50%, in some embodiments ±40%, in some embodiments ±30%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

All combinations of method or process steps as used herein can be performed in any order, unless otherwise specified or clearly implied to the contrary by the context in which the referenced combination is made.

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E1Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

Provided herein is a method of synthesizing a hydrophobic deep eutectic solvent (DES) using one or more lignin-derived compounds. The hydrophobic DESs synthesized from the method disclosed herein may find utility in a variety of applications including, but not limited to, the extraction of plastic contaminants from water samples, the extraction of bioactive compounds, biomass fractionation, bioseparation, antimicrobial production, herbicidal applications, drug delivery applications, electrolyte for batteries, and formulating a two-phase reaction system.

Lignin is a phenolic polymer that is mainly composed of three phenolic monomers—namely, p-hydroxyphenyl, guaiacyl, and syringyl—making it promising for the production of aromatic chemicals via chemical or biological routes. In general, lignin can be used to directly produce phenols including phenol, benzene, and the three above-identified phenolic monomers. Through catalytic reactions, such as oxidation and hydrogenation, the phenols from lignin can be upgraded to phenolic or other hydroxylated compounds. Due to its high polarity, the hydroxyl group(s) of these lignin-derived compounds can easily provide or attract hydrogen to facilitate hydrogen bonding. Accordingly, a lignin-derived compound may act, in some DES systems, as a hydrogen bond donor (HBD), while, in other DES systems, the same lignin-derived compound may act as a hydrogen bond acceptor (HBA). For example, 2,6-dimethoxyphenol may serve as a HBD when used with thymol in the synthesis of a hydrophobic DES and may serve as a HBA when used with phenol in the synthesis of a hydrophobic DES.

In the method of the present disclosure, a hydrophobic DES is synthesized by initially mixing a lignin-derived compound (first compound or first lignin-derived compound) with a second compound that is different than the first compound to create a mixture, where, during synthesis of the hydrophobic DES, one compound of the mixture will act as a HBD and the other compound of the mixture will act as a hydrogen bond acceptor HBA. The mixture is subsequently heated and stirred using known heating and mixing means until a homogenous liquid is obtained, thus resulting in the synthesis of the hydrophobic DES.

As lignin-derived compounds are sourced from environmentally friendly renewable biomasses, it is generally preferred that the second compound used in the synthesis of the hydrophobic DES also be a lignin-derived compound. Accordingly, in one aspect, the presently disclosed subject matter is directed to a method of synthesizing a hydrophobic DES which utilizes a first lignin-derived compound and a second lignin-derived compound, wherein one of the first lignin-derived compound and the second lignin-derived compound acts as a HBD and the other of the first lignin-derived compound and the second lignin-derived compound acts as a HBA. The use of two lignin-derived compounds may prove particularly advantageous by helping to ensure the DES synthesized is hydrophobic. The hydrophobicity of a DES can be impacted by the properties of its components. For example, common quaternary ammonium salts, such as choline chloride, are highly soluble in water. Thus, DESs which are formed using such salts are more likely to be hydrophilic. Additionally, salts which have a low solubility in water are generally more expensive.

In some embodiments, the first lignin-derived compound and/or the second lignin-derived compound is aromatic (i.e., an aromatic compound) (FIGS. 1A-H, 2A-H, 3A-H, and 4A-J). In some embodiments, the first lignin-derived compound and/or the second lignin-derived compound is selected from: thymol

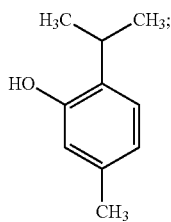

2,6-dimethoxyphenol

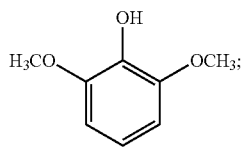 [SMILES: COc1cccc(OC)c1O]

vanillin

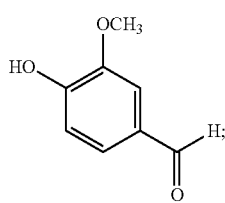

phenol

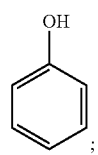

1-phenylethanol

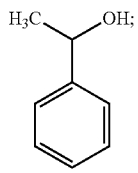

guaiacol

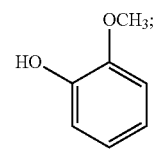

and 4-hydroxybenzyl alcohol

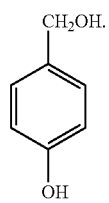

In some embodiments, both the first lignin-derived compound and the second lignin derived compound are aromatic (FIGS. 2A-H and 4A-J).

In some embodiments, the first lignin-derived compound and/or the second lignin-derived compound is phenolic (i.e., a phenolic compound) (FIGS. 1A-F, 1H, 2A-H, 3A-G, and 4A-J). In some embodiments, the first lignin-derived compound and/or the second lignin-derived compound is selected from: thymol; 2-6-dimethoxyphenol; vanillin; phenol; guaiacol; and 4-hydroxybenzyl alcohol. In some embodiments, both the first lignin-derived compound and the second lignin-derived compound are phenolic (FIGS. 2A-H and 4A-J).

In some embodiments, the first lignin-derived compound and the second lignin-derived compound are each a monocyclic compound including at least one hydroxyl group attached to a ring structure of the monocyclic compound (FIGS. 1A-G, 2A-H, 3A-G, and 4A-J). In some embodiments, the first lignin-derived compound and/or the second lignin-derived compound is a terpenoid (FIGS. 1A-H and 2A-H).

In one exemplary embodiment, the first lignin derived-compound is aromatic and the second lignin-derived compound is a cyclic compound including at least one hydroxyl group attached to a ring structure of the cyclic compound (FIGS. 1A-H, 2A-H, and 4A-J), where the first lignin-derived compound and the second lignin-derived compound are not the same compound. In one such embodiment, both the first lignin-derived compound and the second lignin-derived compound are phenolic and/or aromatic (FIGS. 2A-H and 4A-J). In another such embodiment, the first lignin-derived compound is selected from: thymol; 2,6-dimethoxyphenol; vanillin; phenol; 1-phenylethanol; guaiacol; and 4-hydroxybenzyl alcohol.

In some embodiments, the cyclic compound used as the second lignin-derived compound is aromatic (FIGS. 2A-H and FIGS. 4A-J). In some embodiments, the cyclic compound used as the second lignin-derived compound is a monocyclic compound (FIGS. 1A-H, 2A-H, 4A-J). In one such embodiment, the cyclic compound used for the second lignin-derived compound is a terpenoid, which, in some cases, may be selected from: menthol

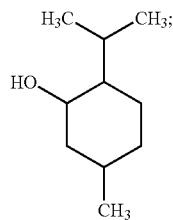

and thymol (FIGS. 1A-H and 2A-H).

In some embodiments, the mixture created by mixing the first lignin-derived compound and the second lignin-derived compound is heated so that the temperature of the mixture is increased to a value of about 40° C. to about 120° C. In some embodiments, the mixture created from the first lignin-derived compound and the second lignin-derived compound is heated so that the temperature of the mixture is increased to a value of about 60° C. to about 100° C. In some embodiments, the first lignin-derived compound and the second lignin-derived compound may be mixed in a molar ratio of about 1:1, about 1:2, about 2:1, about 3:1, about 4:1, or about 5:1.

In another aspect, the presently disclosed subject matter is directed to a method of synthesizing a hydrophobic DES which utilizes only a single lignin-derived compound. In such embodiments, instead of utilizing a second lignin-derived compound within the mixture that is subsequently heated and stirred to synthesize the hydrophobic DES, a fatty acid which includes at least one carboxyl group is utilized. Due to its high polarity, the carboxyl group(s) of the fatty acid can easily provide or attract hydrogen to facilitate hydrogen bonding. Accordingly, the fatty acid may act, in some DES systems, as a hydrogen bond donor HBD, while, in other DES systems, the fatty acid may act as a HBA. In some embodiments, the fatty acid used in the mixture is decanoic acid

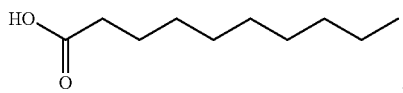

In some embodiments, the lignin-derived compound with which the fatty acid is mixed is aromatic (FIGS. 3A-H). In some embodiments, the lignin-derived compound with which the fatty acid is mixed is phenolic (FIGS. 3A-G). In some embodiments, the lignin derived compound with which the fatty is mixed is selected from 2,6-dimethoxyphenol, phenol, guaiacol, and 1-phenylethanol.

In some embodiments, the mixture created from the lignin-derived compound and the fatty acid is heated so that the temperature of the mixture is increased to a value of about 40° C. to about 120° C. In some embodiments, the mixture created from the lignin-derived compound and the fatty acid is heated so that the temperature of the mixture is increased to a value of about 60° C. to about 100° C. In some embodiments, the first lignin-derived compound and the second lignin-derived compound may be mixed in a molar ratio of about 1:1, about 1:2, or about 2:1.

The presently-disclosed subject matter is further illustrated by the following specific but non-limiting examples. The following examples may include compilations of data that are representative of data gathered at various times during the course of development and experimentation related to the presently-disclosed subject matter. Those skilled in the art will recognize, or be able to ascertain, using no more than routine experimentation, numerous equivalents to the specific substances and procedures described herein.

Examples

The following examples focus on the discoveries that (i) certain lignin-derived compounds can be combined with each other to synthesize a DES that exhibits hydrophobic properties and (ii) certain lignin-derived compounds can be combined with certain fatty acids to synthesize a DES that exhibits hydrophobic properties. More specifically, the following examples focus on the formulations outlined in Table 1 below, in which sample numbers 1-8, 9-16, 17-24, and 25-34 correspond to the number labels shown in FIGS. 1A-H, 2A-H, 3A-H, and 4A-J, respectively. It should be appreciated that the headings entitled "Compound A" and "Compound B" within Table 1 do not necessarily imply that the compounds listed thereunder correspond to the first compound or the second compound referred to above. Rather, embodiments are contemplated in which Compound A and Compound B correspond to the first compound and the second compound, respectively, as well as embodiments in which Compound B and Compound A correspond to the first compound and the second compound, respectively.

TABLE 1

| Sample | Compound A | Compound B | Ratio (Compound A:Compound B) |
|---|---|---|---|
| 1 | Menthol | 2,6-dimethoxyphenol | 1:1 |
| 2 | Menthol | 2,6-dimethoxyphenol | 1:2 |
| 3 | Menthol | 2,6-dimethoxyphenol | 2:1 |
| 4 | Menthol | phenol | 1:1 |
| 5 | Menthol | phenol | 1:2 |
| 6 | Menthol | phenol | 2:1 |
| 7 | Menthol | 1-phenylethanol | 1:1 |
| 8 | Menthol | guaiacol | 1:1 |
| 9 | Thymol | vanillin | 1:1 |
| 10 | Thymol | 2,6-dimethoxyphenol | 1:1 |
| 11 | Thymol | 2,6-dimethoxyphenol | 1:2 |
| 12 | Thymol | 2,6-dimethoxyphenol | 2:1 |
| 13 | Thymol | phenol | 1:1 |
| 14 | Thymol | phenol | 1:2 |
| 15 | Thymol | phenol | 2:1 |
| 16 | Thymol | guaiacol | 1:1 |
| 17 | Decanoic acid | 2,6-dimethoxyphenol | 1:1 |
| 18 | Decanoic acid | 2,6-dimethoxyphenol | 1:2 |
| 19 | Decanoic acid | 2,6-dimethoxyphenol | 2:1 |
| 20 | Decanoic acid | phenol | 1:1 |
| 21 | Decanoic acid | phenol | 1:2 |
| 22 | Decanoic acid | phenol | 2:1 |
| 23 | Decanoic acid | guaiacol | 1:1 |
| 24 | Decanoic acid | 1-phenylethanol | 1:1 |
| 25 | 2,6-dimethoxyphenol | 4-hydroxybenzyl alcohol | 1:1 |
| 26 | 2,6-dimethoxyphenol | 4-hydroxybenzyl alcohol | 2:1 |
| 27 | 2,6-dimethoxyphenol | 4-hydroxybenzyl alcohol | 3:1 |
| 28 | 2,6-dimethoxyphenol | 4-hydroxybenzyl alcohol | 4:1 |
| 29 | 2,6-dimethoxyphenol | 4-hydroxybenzyl alcohol | 5:1 |
| 30 | 2,6-dimethoxyphenol | vanillin | 1:1 |
| 31 | 2,6-dimethoxyphenol | vanillin | 2:1 |

TABLE 1-continued

| Sample | Compound A | Compound B | Ratio (Compound A:Compound B) |
|---|---|---|---|
| 32 | 2,6-dimethoxyphenol | phenol | 1:1 |
| 33 | 2,6-dimethoxyphenol | phenol | 1:2 |
| 34 | 2,6-dimethoxyphenol | phenol | 2:1 |

Materials and Methods

In the examples described below, reference is made to the use of lignin-derived compounds including: menthol, thymol, 2,6-dimethoxyphenol, phenol, 1-phenylethanol, guaiacol, vanillin, 4-hydroxy benzyl alcohol. Menthol can naturally be obtained by freezing the oil of mint plants, followed by filtration to separate the menthol crystals or be produced through the Haarmann-Reimer process using lignin-derived m-Cresol as feedstock. Thymol can be extracted from thyme oil or be synthesized via alkylation of lignin-derived m-Cresol. 2,6-dimethoxyphenol, phenol, and guaiacol can each be obtained by subjecting a lignin sample to thermal decomposition. 1-phenylethanol can be obtained by the reduction or hydrogenation of lignin-derived acetophenone. Vanillin and 4-hydroxybenzyl alcohol can be obtained by the catalytic transformation of lignin or, alternatively, via extraction from cured vanilla beans.

In the examples described below, reference is also made to the use of the fatty acid compound of decanoic acid, which can be obtained by the fermentation of organic residues.

Menthol—2,6-Dimethoxyphenol DES

Three DESs were synthesized using the lignin-derived compound of menthol and the lignin-derived compound of 2,6-dimethoxyphenol (Table 1, samples 1-3). Three eutectic mixtures were initially created by mixing menthol and 2,6-dimethoxyphenol in 1:1, 1:2, and 2:1 molar ratios. Following the initial mixing of menthol and 2,6-dimethoxyphenol, each respective mixture was heated at 80° C. and constantly stirred for one hour until a homogenous transparent liquid was obtained, thus indicating formation of the DES. The hydrophobicity of each synthesized DES was then tested by introducing a small volume of water (1 mL) into a vial containing the synthesized DES (0.5 mL) and then mixing the contents of the vial (FIGS. 1A-C). The resulting mixture exhibited two distinct phases: one phase comprising the DES synthesized from menthol and 2,6-dimethoxyphenol and another phase comprising water. Specifically, in the mixtures including the DESs synthesized using menthol and 2,6-dimethoxyphenol in 1:1 and 1:2 molar ratios, the bottom phase of the mixture comprised the DES synthesized from menthol and 2,6-dimethoxyphenol, and the top phase comprised water, thus indicating that the DESs synthesized using menthol and 2,6-dimethoxyphenol in 1:1 and 1:2 molar ratios were hydrophobic (FIGS. 1A and 1B). In the mixture including the DES synthesized using menthol and 2,6-dimethoxyphenol in a 2:1 molar ratio, the top phase comprised DES synthesized from menthol and 2,6-dimethoxyphenol, and the bottom phase comprised water, thus indicating that the DES synthesized from menthol and 2,6-dimethoxyphenol in a 2:1 molar ratio was hydrophobic (FIG. 1C).

Menthol—Phenol DES

Three DESs were synthesized using the lignin-derived compound of menthol and the lignin-derived compound of phenol (Table 1, samples 4-6). Three eutectic mixtures were initially created by mixing menthol and phenol in 1:1, 1:2, and 2:1 molar ratios. Following the initial mixing of menthol and phenol, each respective mixture was heated at 60° C. and constantly stirred for two hours until a homogeneous transparent liquid was obtained, thus indicating formation of the DES. The hydrophobicity of each synthesized DES was then tested by introducing a small volume of water (1 mL) into a vial containing the synthesized DES (0.5 mL) and then mixing the contents of the vial (FIGS. 1D-F). The resulting mixture exhibited two distinct phases: a top phase comprising the DES synthesized using menthol and phenol; and a bottom phase comprising water, thus indicating that each of the DESs synthesized using menthol and phenol were hydrophobic.

Menthol—1-Phenylethanol DES

A single DES was synthesized using the lignin-derived compound of menthol and the lignin-derived compound of 1-phenylethanol (Table 1, sample 7). A eutectic mixture was initially created by mixing menthol and 1-phenylethanol in a 1:1 molar ratio. Following the initial mixing of menthol and 1-phenylethanol, the mixture was heated at 60° C. and constantly stirred for one hour until a homogenous transparent liquid was obtained, thus indicating formation of the DES. The hydrophobicity of the synthesized DES was then tested by introducing a small volume of water (1 mL) into a vial containing the synthesized DES (0.5 mL) and then mixing the contents of the vial (FIG. 1G). The resulting mixture exhibited two distinct phases: a top phase comprising the DES synthesized from menthol and 1-phenylethanol; and a bottom phase comprising water, thus indicating that the DES synthesized using menthol and 1-phenylethanol was hydrophobic.

Menthol—Guaiacol DES

A single DES was synthesized using the lignin-derived compound of menthol and the lignin-derived compound of guaiacol (Table 1, sample 8). A eutectic mixture was initially created by mixing menthol and guaiacol in a 1:1 molar ratio. Following the initial mixing of menthol and 1-phenylethanol, the mixture was heated at 60° C. and constantly stirred for one hour until a homogenous transparent liquid was obtained, thus indicating formation of the DES. The hydrophobicity of the synthesized DES was then tested by introducing a small volume of water (1 mL) into a vial containing the synthesized DES (0.5 mL) and then mixing the contents of the vial (FIG. 1H). The resulting mixture exhibited two distinct phases: a top phase comprising the DES synthesized using menthol and guaiacol; and a bottom phase comprising water, thus indicating that the DES synthesized using menthol and guaiacol was hydrophobic.

Thymol—Vanillin DES

Figures 2A, 2B, 2C, 2D, 2E, 2F, 2G, 2H:
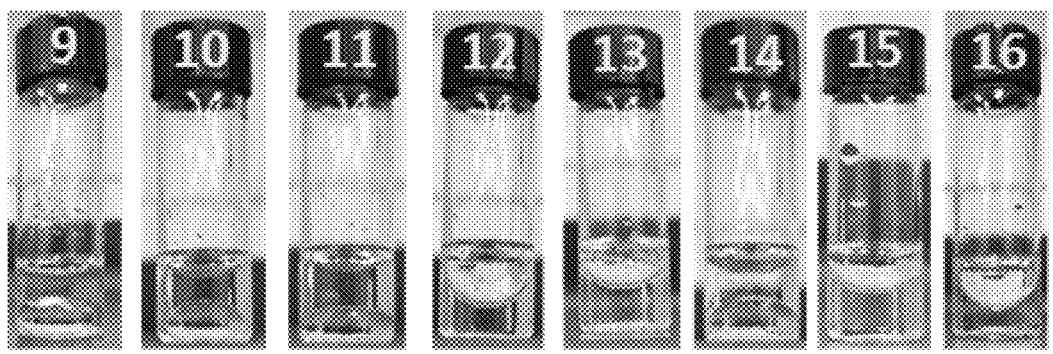
FIGS. 2A-H are various images showing a phase separation of water and a hydrophobic deep eutectic solvent (DES) synthesized from a first lignin-derived compound and a second lignin-derived compound, in which one of the lignin-derived compounds is thymol.

A single DES was synthesized using the lignin-derived compound of thymol and the lignin-derived compound of vanillin (Table 1, sample 9). A eutectic mixture was initially created by mixing thymol and vanillin in a 1:1 molar ratio. Following the initial mixing of thymol and vanillin, the mixture was heated at 80° C. and constantly stirred for two hours until a homogenous transparent liquid was obtained, thus indicating formation of the DES. The hydrophobicity of the synthesized DES was then tested by introducing a small volume of water (1 mL) into a vial containing the synthesized DES (0.5 mL) and then mixing the contents of the vial (FIG. 2A). The resulting mixture exhibited two distinct phases: a bottom phase comprising the DES synthesized using thymol and vanillin; and a top phase comprising water, thus indicating that the DES synthesized using thymol and vanillin was hydrophobic.

Thymol—2,6-dimethoxyphenol DES

Three DESs were synthesized using the lignin-derived compound of thymol and the lignin-derived compound of 2,6-dimethoxyphenol (Table 1, samples 10-12). Three eutectic mixtures were initially created by mixing thymol and 2,6-dimethoxyphenol in 1:1, 1:2, and 2:1 molar ratios. Following the initial mixing of thymol and 2,6-dimethoxyphenol, each respective mixture was heated at 80° C. and constantly stirred for one hour until a homogenous transparent liquid was obtained, thus indicating formation of the DES. The hydrophobicity of each synthesized DES was then tested by introducing a small volume of water (1 mL) into a vial containing the synthesized DES (0.5 mL) and then mixing the contents of the vial (FIGS. 2B-D). The resulting mixture exhibited two distinct phases: one phase comprising the DES synthesized from thymol and 2,6-dimethoxyphenol and another phase comprising water. Specifically, in the mixtures including the DESs synthesized using thymol and 2,6-dimethoxyphenol in 1:1 and 1:2 molar ratios, the bottom phase of the mixture comprised the DES synthesized from thymol and 2,6-dimethoxyphenol, and the top phase comprised water, thus indicating that the DESs synthesized using thymol and 2,6-dimethoxyphenol in 1:1 and 1:2 molar ratios were hydrophobic (FIGS. 2B and 2C). In the mixture including the DES synthesized using thymol and 2,6-dimethoxyphenol in a 2:1 molar ratio, the top phase comprised DES synthesized from thymol and 2,6-dimethoxyphenol, and the bottom phase comprised water, thus indicating that the DES synthesized from thymol and 2,6-dimethoxyphenol in a 2:1 molar ratio was hydrophobic (FIG. 2D).

Thymol—Phenol DES

Three DESs were synthesized using the lignin-derived compound of thymol and the lignin-derived compound of phenol (Table 1, samples 13-15). Three eutectic mixtures were initially created by mixing thymol and phenol in 1:1, 1:2, and 2:1 molar ratios. Following the initial mixing of thymol and phenol, each respective mixture was heated at 80° C. and constantly stirred for one hour until a homogenous transparent liquid was obtained, thus indicating formation of the DES. The hydrophobicity of each synthesized DES was then tested by introducing a small volume of water (1 mL) into a vial containing the synthesized DES (0.5 mL) and then mixing the contents of the vial (FIGS. 2E-G). The resulting mixture exhibited two distinct phases: one phase comprising the DES synthesized from thymol and phenol and another phase comprising water. Specifically, in the mixtures including the DESs synthesized using thymol and phenol in 1:1 and 2:1 molar ratios, the top phase of the mixture comprised the DES synthesized from thymol and phenol, and the bottom phase comprised water, thus indicating that the DESs synthesized using thymol and phenol in 1:1 and 2:1 molar ratios were hydrophobic (FIGS. 2E and 2G). In the mixture including the DES synthesized using thymol and phenol in a 1:2 molar ratio, the top phase comprised DES synthesized from thymol and phenol, and the bottom phase comprised water, thus indicating that the DES synthesized from thymol and phenol in a 1:2 molar ratio was hydrophobic (FIG. 2F).

Thymol—Guaiacol DES

A single DES was synthesized using the lignin-derived compound of thymol and the lignin-derived compound of guaiacol (Table 1, sample 16). A eutectic mixture was initially created by mixing thymol and guaiacol in a 1:1 molar ratio. Following the initial mixing of thymol and guaiacol, the mixture was heated at 100° C. and constantly stirred for one hour until a homogenous transparent liquid was obtained, thus indicating formation of the DES. The hydrophobicity of the synthesized DES was then tested by introducing a small volume of water (1 mL) into a vial containing the synthesized DES (0.5 mL) and then mixing the contents of the vial (FIG. 2I). The resulting mixture exhibited two distinct phases: a top phase comprising the DES synthesized using thymol and guaiacol; and a bottom phase comprising water, thus indicating that the DES synthesized using thymol and guaiacol was hydrophobic.

Decanoic Acid—2,6-Dimethoxyphenol DES

Figures 3A, 3B, 3C, 3D, 3E, 3F, 3G, 3H:
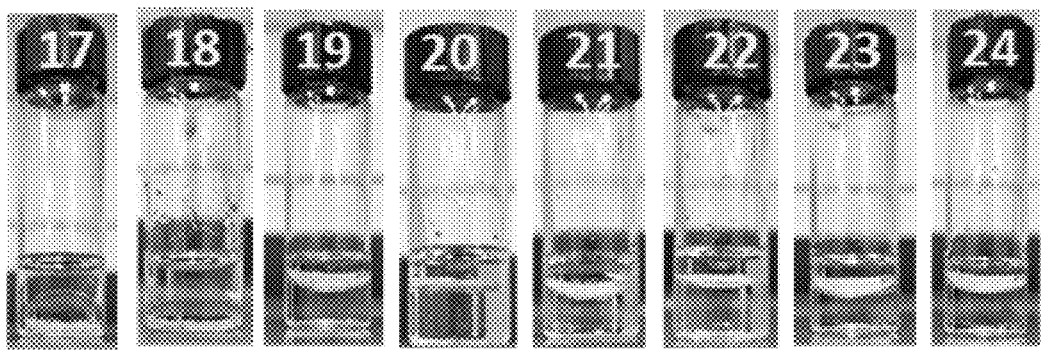
FIGS. 3A-H are various images showing a phase separation of water and a hydrophobic deep eutectic solvent (DES) synthesized from decanoic acid and a lignin-derived compound.

Three DESs were synthesized using the fatty acid decanoic acid and the lignin-derived compound of 2,6-dimethoxyphenol (Table 1, samples 17-19). Three eutectic mixtures were initially created by mixing decanoic acid and 2,6-dimethoxyphenol in 1:1, 1:2, and 2:1 molar ratios. Following the initial mixing of decanoic acid and 2,6-dimethoxyphenol, each respective mixture was heated at 100° C. and constantly stirred for two hours until a homogenous transparent liquid was obtained, thus indicating formation of the DES. The hydrophobicity of each synthesized DES was then tested by introducing a small volume of water (1 mL) into a vial containing the synthesized DES (0.5 mL) and then mixing the contents of the vial (FIGS. 3A-C). The resulting mixture exhibited two distinct phases: one phase comprising the DES synthesized from decanoic acid and 2,6-dimethoxyphenol and another phase comprising water. Specifically, in the mixtures including the DESs synthesized using decanoic acid and 2,6-dimethoxyphenol in 1:1 and 1:2 molar ratios, the bottom phase of the mixture comprised the DES synthesized from decanoic acid and 2,6-dimethoxyphenol, and the bottom phase comprised water, thus indicating that the DESs synthesized using decanoic acid and 2,6-dimethoxyphenol in 1:1 and 1:2 molar ratios were hydrophobic (FIGS. 3A and 3B). In the mixture including the DES synthesized using decanoic acid and 2,6-dimethoxyphenol in a 2:1 molar ratio, the top phase comprised DES synthesized from decanoic acid and 2,6-dimethoxyphenol, and the bottom phase comprised water, thus indicating that the DES synthesized from decanoic acid and 2,6-dimethoxyphenol in a 2:1 molar ratio was hydrophobic (FIG. 3C).

Decanoic Acid—Phenol DES

Three DESs were synthesized using the fatty acid decanoic acid and the lignin-derived compound of phenol (Table 1, samples 20-22). Three eutectic mixtures were initially created by mixing decanoic acid and phenol in 1:1, 1:2, and 2:1 molar ratios. Following the initial mixing of decanoic acid and phenol, each respective mixture was heated at 80° C. and constantly stirred for one hour until a homogenous transparent liquid was obtained, thus indicating formation of the DES. The hydrophobicity of each synthesized DES was then tested by introducing a small volume of water (1 mL) into a vial containing the synthesized DES (0.5 mL) and then mixing the contents of the vial (FIGS. 3D-F). The resulting mixture exhibited two distinct phases: a top phase comprising the DES synthesized using decanoic acid and phenol; and a bottom phase comprising water, thus indicating that each of the DESs synthesized using decanoic acid and phenol were hydrophobic.

Decanoic Acid—Guaiacol DES

A single DES was synthesized using the fatty acid decanoic acid and the lignin-derived compound of guaiacol (Table 1, sample 23). A eutectic mixture was initially created by mixing decanoic acid and guaiacol in a 1:1 molar ratio. Following the initial mixing of menthol and guaiacol, the mixture was heated at 80° C. and constantly stirred for one hour until a homogenous transparent liquid was obtained, thus indicating formation of the DES. The hydrophobicity of the synthesized DES was then tested by introducing a small volume of water (1 mL) into a vial containing the synthesized DES (0.5 mL) and then mixing the contents of the vial (FIG. 3G). The resulting mixture exhibited two distinct phases: a top phase comprising the DES synthesized using decanoic acid and guaiacol; and a bottom phase comprising water, thus indicating that the DES synthesized using decanoic acid and guaiacol was hydrophobic.

Decanoic Acid—1-Phenylethanol DES

A single DES was synthesized using the fatty acid decanoic acid and the lignin-derived compound of 1-phenylethanol (Table 1, sample 24). A eutectic mixture was initially created by mixing decanoic acid and 1-phenylethanol in a 1:1 molar ratio. Following the initial mixing of menthol and 1-phenylethanol, the mixture was heated at 60° C. and constantly stirred for two hours until a homogenous transparent liquid was obtained, thus indicating formation of the DES. The hydrophobicity of the synthesized DES was then tested by introducing a small volume of water (1 mL) into a vial containing the synthesized DES (0.5 mL) and then mixing the contents of the vial (FIG. 3H). The resulting mixture exhibited two distinct phases: a top phase comprising the DES synthesized using decanoic acid and 1-phenylethanol; and a bottom phase comprising water, thus indicating that the DES synthesized using decanoic acid and 1-phenylethanol was hydrophobic.

2,6-Dimethoxyphenol—4-Hydroxybenzyl Alcohol DES

Five DESs were synthesized using the lignin-derived compound of 2,6-dimethoxyphenol and the lignin-derived compound of 4-hydroxybenzyl alcohol (Table 1, samples 25-29). Five eutectic mixtures were initially created by mixing 2,6-dimethoxyphenol and 4-hydroxybenzyl alcohol in 1:1, 2:1, 3:1, 4:1, and 5:1 molar ratios. Following the initial mixing of 2,6-dimethoxyphenol and 4-hydroxybenzyl alcohol, each respective mixture was heated at 100° C. and constantly stirred for one hour until a homogenous transparent liquid was obtained, thus indicating formation of the DES. The hydrophobicity of each synthesized DES was then tested by introducing a small volume of water (1 mL) into a vial containing the synthesized DES (0.5 mL) and then mixing the contents of the vial (FIGS. 4A-E). The resulting mixture exhibited two distinct phases: a bottom phase comprising the DES synthesized using 2,6-dimethoxyphenol and 4-hydroxybenzyl alcohol; and a top phase comprising water, thus indicating that each of the synthesized using 2,6-dimethoxyphenol and 4-hydroxybenzyl alcohol were hydrophobic.

2,6-Dimethoxyphenol—Vanillin DES

Figures 4A, 4B, 4C, 4D, 4E, 4F, 4G, 4H, 4I, 4J:
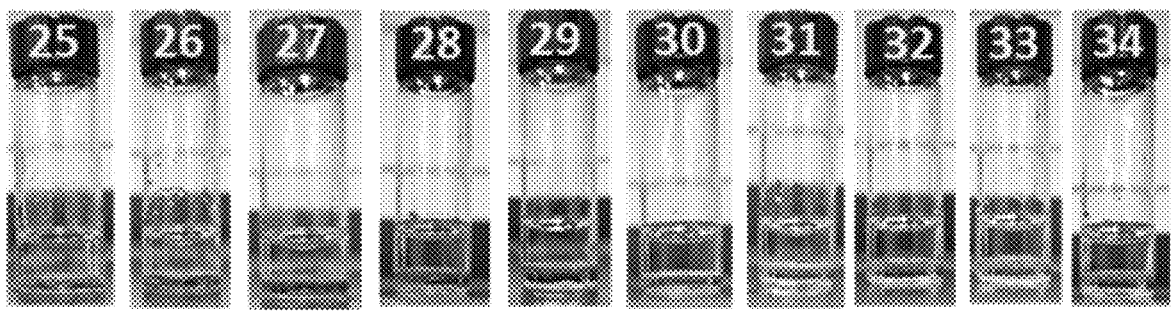
FIGS. 4A-J are various images showing a phase separation of water and a hydrophobic deep eutectic solvent (DES) synthesized from a first lignin-derived compound and a second lignin-derived compound, in which one of the lignin-derived compounds is 2,6-dimethoxyphenol.

Two DESs were synthesized using the lignin-derived compound of 2,6-dimethoxyphenol and the lignin-derived compound of vanillin (Table 1, samples 30-31). Two eutectic mixtures were initially created by mixing 2,6-dimethoxyphenol and vanillin in 1:1 and 2:1 molar ratios. Following the initial mixing of 2,6-dimethoxyphenol and vanillin, each respective mixture was heated at 80° C. and constantly stirred for one hour until a homogenous transparent liquid was obtained, thus indicating formation of the DES. The hydrophobicity of each synthesized DES was then tested by introducing a small volume of water (1 mL) into a vial containing the synthesized DES (0.5 mL) and then mixing the contents of the vial (FIGS. 4F-G). The resulting mixture exhibited two distinct phases: a bottom phase comprising the DES synthesized using 2,6-dimethoxyphenol and vanillin; and a top phase comprising water, thus indicating that each of the DESs synthesized using 2,6-dimethoxyphenol and vanillin were hydrophobic.

2,6-Dimethoxyphenol—Phenol DES

Three DESs were synthesized using the lignin-derived compound of 2,6-dimethoxyphenol and the lignin-derived compound of phenol (Table 1, samples 32-34). Two eutectic mixtures were initially created by mixing 2,6-dimethoxyphenol and phenol in 1:1, 1:2, and 2:1 molar ratios. Following the initial mixing of 2,6-dimethoxyphenol and phenol, each respective mixture was heated at 80° C. and constantly stirred for one hour until a homogenous transparent liquid was obtained, thus indicating formation of the DES. The hydrophobicity of each synthesized DES was then tested by introducing a small volume of water (1 mL) into a vial containing the synthesized DES (0.5 mL) and then mixing the contents of the vial (FIGS. 4H-J). The resulting mixture exhibited two distinct phases: a bottom phase comprising the DES synthesized using 2,6-dimethoxyphenol and phenol; and a top phase comprising water, thus indicating that each of the DESs synthesized using 2,6-dimethoxyphenol and phenol were hydrophobic.

All publications, patents, and patent applications mentioned in this specification are herein incorporated by reference to the same extent as if each individual publication, patent, or patent application was specifically and individually indicated to be incorporated by reference, including the references set forth in the following references list:

REFERENCES

1. Barnes, D. K. A., Invasions by marine life on plastic debris. *Nature* 2002, 416 (6883), 808-809.
2. Mason, S. A.; Kammin, L.; Eriksen, M.; Aleid, G.; Wilson, S.; Box, C.; Williamson, N.; Riley, A., Pelagic plastic pollution within the surface waters of Lake Michigan, USA. *Journal of Great Lakes Research* 2016, 42 (4), 753-759.
3. Wilcox, C.; Van Sebille, E.; Hardesty, B. D., Threat of plastic pollution to seabirds is global, pervasive, and increasing. *Proceedings of the National Academy of Sciences* 2015, 112 (38), 11899-11904.
4. Cózar, A.; Echevarria, F.; González-Gordillo, J. I.; Irigoien, X.; Úbeda, B.; Hernandez-León, S.; Palma, Á. T.; Navarro, S.; Garcia-de-Lomas, J.; Ruiz, A.; Fernández-de-Puelles, M. L.; Duarte, C. M., Plastic debris in the open ocean. *Proceedings of the National Academy of Sciences* 2014, 111 (28), 10239-10244.
5. Borrelle, S. B.; Rochman, C. M.; Liboiron, M.; Bond, A. L.; Lusher, A.; Bradshaw, H.; Provencher, J. F., Opinion: Why we need an international agreement on marine plastic pollution. *Proceedings of the National Academy of Sciences* 2017, 114 (38), 9994-9997.
6. Gibb, B. C., Plastics are forever. *Nature Chemistry* 2019, 11 (5), 394-395.
7. Eriksen, M.; Lebreton, L. C. M.; Carson, H. S.; Thiel, M.; Moore, C. J.; Borerro, J. C.; Galgani, F.; Ryan, P. G.; Reisser, J., Plastic Pollution in the World's Oceans: More than 5 Trillion Plastic Pieces Weighing over 250,000 Tons Afloat at Sea. *PLOS ONE* 2014, 9 (12), e111913.
8. Geyer, R.; Jambeck, J. R.; Law, K. L., Production, use, and fate of all plastics ever made. *Science Advances* 2017, 3 (7), e1700782.
9. Ng, E.-L.; Huerta Lwanga, E.; Eldridge, S. M.; Johnston, P.; Hu, H.-W.; Geissen, V.; Chen, D., An overview of microplastic and nanoplastic pollution in agroecosystems. *Science of The Total Environment* 2018, 627, 1377-1388.
10. Cortés, C.; Domenech, J.; Salazar, M.; Pastor, S.; Marcos, R.; Hernández, A., Nanoplastics as a potential environmental health factor: effects of polystyrene nanoparticles on human intestinal epithelial Caco-2 cells. *Environmental Science: Nano* 2020.
11. Revel, M.; Châtel, A.; Mouneyrac, C., Micro(nano) plastics: A threat to human health? *Current Opinion in Environmental Science & Health* 2018, 1, 17-23.
12. Mattsson, K.; Jocic, S.; Doverbratt, I.; Hansson, L.-A., Chapter 13—Nanoplastics in the Aquatic Environment. In *Microplastic Contamination in Aquatic Environments*, Zeng, E. Y., Ed. Elsevier: 2018; pp 379-399.
13. Gigault, J.; Halle, A. t.; Baudrimont, M.; Pascal, P.-Y.; Gauffre, F.; Phi, T.-L.; El Hadri, H.; Grassl, B.; Reynaud, S., Current opinion: What is a nanoplastic? *Environmental Pollution* 2018, 235, 1030-1034.
14. Hernandez, L. M.; Yousefi, N.; Tufenkji, N., Are There Nanoplastics in Your Personal Care Products? *Environmental Science & Technology Letters* 2017, 4 (7), 280-285.
15. da Costa, J. P.; Santos, P. S. M.; Duarte, A. C.; Rocha-Santos, T., (Nano)plastics in the environment—Sources, fates and effects. *Science of The Total Environment* 2016, 566-567, 15-26.
16. Koelmans, A. A., Proxies for nanoplastic. *Nature Nanotechnology* 2019, 14 (4), 307-308.
17. Wagner, S.; Reemtsma, T., Things we know and don't know about nanoplastic in the environment. *Nature Nanotechnology* 2019, 14 (4), 300-301.
18. Ter Halle, A.; Jeanneau, L.; Martignac, M.; Jardé, E.; Pedrono, B.; Brach, L.; Gigault, J., Nanoplastic in the North Atlantic Subtropical Gyre. *Environmental Science & Technology* 2017, 51 (23), 13689-13697.
19. Alimi, O. S.; Farner Budarz, J.; Hernandez, L. M.; Tufenkji, N., Microplastics and Nanoplastics in Aquatic Environments: Aggregation, Deposition, and Enhanced Contaminant Transport. *Environmental Science & Technology* 2018, 52 (4), 1704-1724.
20. Shen, M.; Zhang, Y.; Zhu, Y.; Song, B.; Zeng, G.; Hu, D.; Wen, X.; Ren, X., Recent advances in toxicological research of nanoplastics in the environment: A review. *Environmental Pollution* 2019, 252, 511-521.
21. Nguyen, B.; Claveau-Mallet, D.; Hernandez, L. M.; Xu, E. G.; Farner, J. M.; Tufenkji, N., Separation and Analysis of Microplastics and Nanoplastics in Complex Environmental Samples. *Accounts of Chemical Research* 2019, 52 (4), 858-866.
22. Heddagaard, F. E.; Møller, P., Hazard assessment of small-size plastic particles: is the conceptual framework of particle toxicology useful? *Food and Chemical Toxicology* 2019, 111106.
23. Mao, Y.; Li, H.; Huangfu, X.; Liu, Y.; He, Q., Nanoplastics display strong stability in aqueous environments: Insights from aggregation behaviour and theoretical calculations. *Environmental Pollution* 2020, 258, 113760.
24. van Osch, D. J. G. P.; Zubeir, L. F.; van den Bruinhorst, A.; Rocha, M. A. A.; Kroon, M. C., Hydrophobic deep eutectic solvents as water-immiscible extractants. *Green Chemistry* 2015, 17 (9), 4518-4521.
25. Zhang, Q.; De Oliveira Vigier, K.; Royer, S.; Jérôme, F., Deep eutectic solvents: syntheses, properties and applications. *Chemical Society Reviews* 2012, 41 (21), 7108-7146.
26. Liu, Y.; Friesen, J. B.; McAlpine, J. B.; Lankin, D. C.; Chen, S.-N.; Pauli, G. F., Natural Deep Eutectic Solvents: Properties, Applications, and Perspectives. *Journal of Natural Products* 2018, 81 (3), 679-690.
27. Florindo, C.; Branco, L. C.; Marrucho, I. M., Development of hydrophobic deep eutectic solvents for extraction of pesticides from aqueous environments. *Fluid Phase Equilibria* 2017, 448, 135-142.
28. Cao, J.; Yang, M.; Cao, F.; Wang, J.; Su, E., Well-Designed Hydrophobic Deep Eutectic Solvents As Green and Efficient Media for the Extraction of Artemisinin from Artemisia annua Leaves. *ACS Sustainable Chemistry & Engineering* 2017, 5 (4), 3270-3278.
29. van Osch, D. J. G. P.; Dietz, C. H. J. T.; van Spronsen, J.; Kroon, M. C.; Gallucci, F.; van Sint Annaland, M.; Tuinier, R., A Search for Natural Hydrophobic Deep Eutectic Solvents Based on Natural Components. *ACS Sustainable Chemistry & Engineering* 2019, 7 (3), 2933-2942.
30. Ferreira, I.; Venâncio, C.; Lopes, I.; Oliveira, M., Nanoplastics and marine organisms: What has been studied? *Environmental Toxicology and Pharmacology* 2019, 67, 1-7.
31. Mintenig, S. M.; Bäuerlein, P. S.; Koelmans, A. A.; Dekker, S. C.; van Wezel, A. P., Closing the gap between small and smaller: towards a framework to analyse nano- and microplastics in aqueous environmental samples. *Environmental Science: Nano* 2018, 5 (7), 1640-1649.
32. Lambert, S.; Wagner, M., Characterisation of nanoplastics during the degradation of polystyrene. *Chemosphere* 2016, 145, 265-268.
33. Dawson, A. L.; Kawaguchi, S.; King, C. K.; Townsend, K. A.; King, R.; Huston, W. M.; Bengtson Nash, S. M., Turning microplastics into nanoplastics through digestive fragmentation by Antarctic krill. *Nature Communications* 2018, 9 (1), 1001.
34. Ekvall, M. T.; Lundqvist, M.; Kelpsiene, E.; Sileikis, E.; Gunnarsson, S. B.; Cedervall, T., Nanoplastics formed during the mechanical breakdown of daily-use polystyrene products. *Nanoscale Advances* 2019, 1 (3), 1055-1061.
35. Enfrin, M.; Lee, J.; Gibert, Y.; Basheer, F.; Kong, L.; Dumée, L. F., Release of hazardous nanoplastic contaminants due to microplastics fragmentation under shear stress forces. *Journal of Hazardous Materials* 2020, 384, 121393.
36. Hollóczki, O.; Gehrke, S., Can Nanoplastics Alter Cell Membranes? *Chem Phys Chem* n/a (n/a).
37. Bergami, E.; Pugnalini, S.; Vannuccini, M. L.; Manfra, L.; Faleri, C.; Savorelli, F.; Dawson, K. A.; Corsi, I., Long-term toxicity of surface-charged polystyrene nanoplastics to marine planktonic species Dunaliella tertiolecta and Artemia franciscana. *Aquatic Toxicology* 2017, 189, 159-169.
38. Tallec, K.; Huvet, A.; Di Poi, C.; González-Fernandez, C.; Lambert, C.; Petton, B.; Le Goïc, N.; Berchel, M.; Soudant, P.; Paul-Pont, I., Nanoplastics impaired oyster free living stages, gametes and embryos. *Environmental Pollution* 2018, 242, 1226-1235.
39. Sendra, M.; Saco, A.; Yeste, M. P.; Romero, A.; Novoa, B.; Figueras, A., Nanoplastics: From tissue accumulation to cell translocation into Mytilus galloprovincialis hemocytes. resilience of immune cells exposed to nanoplastics and nanoplastics plus Vibrio splendidus combination. *Journal of Hazardous Materials* 2019, 121788.
40. Abraham, M. J.; Murtola, T.; Schulz, R.; Páll, S.; Smith, J. C.; Hess, B.; Lindahl, E., GROMACS: High performance molecular simulations through multi-level parallelism from laptops to supercomputers. *SoftwareX* 2015, 1-2, 19-25.
41. Luzar, A.; Chandler, D., Hydrogen-bond kinetics in liquid water. *Nature* 1996, 379 (6560), 55-57.

42. Bonomi, M.; Bussi, G.; Camilloni, C.; Tribello, G. A.; Banáš, P.; Barducci, A.; Bernetti, M.; Bolhuis, P. G.; Bottaro, S.; Branduardi, D.; Capelli, R.; Carloni, P.; Ceriotti, M.; Cesari, A.; Chen, H.; Chen, W.; Colizzi, F.; De, S.; De La Pierre, M.; Donadio, D.; Drobot, V.; Ensing, B.; Ferguson, A. L.; Filizola, M.; Fraser, J. S.; Fu, H.; Gasparotto, P.; Gervasio, F. L.; Giberti, F.; Gil-Ley, A.; Giorgino, T.; Heller, G. T.; Hocky, G. M.; Iannuzzi, M.; Invernizzi, M.; Jelfs, K. E.; Jussupow, A.; Kirilin, E.; Laio, A.; Limongelli, V.; Lindorff-Larsen, K.; Lohr, T.; Marinelli, F.; Martin-Samos, L.; Masetti, M.; Meyer, R.; Michaelides, A.; Molteni, C.; Morishita, T.; Nava, M.; Paissoni, C.; Papaleo, E.; Parrinello, M.; Pfaendtner, J.; Piaggi, P.; Piccini, G.; Pietropaolo, A.; Pietrucci, F.; Pipolo, S.; Provasi, D.; Quigley, D.; Raiteri, P.; Raniolo, S.; Rydzewski, J.; Salvalaglio, M.; Sosso, G. C.; Spiwok, V.; Sponer, J.; Swenson, D. W. H.; Tiwary, P.; Valsson, 0.; Vendruscolo, M.; Voth, G. A.; White, A.; The, P. c., Promoting transparency and reproducibility in enhanced molecular simulations. *Nature Methods* 2019, 16 (8), 670-673.

43. Kim K.; Dutta T.; Sun J.; Simmons B.; Singh S., Biomass Pretreatment Using Deep Eutectic Solvent From Lignin Derived Phenols. *ResearchGate* 2018, available at https://www.researchgate.net/publication/322345426_Biomass_Pretreatment_using_Deep_Eutectic_Solvent_from_Lignin_derived_Phenols (retrieved Oct. 26, 2020).

44. Kim K.; Dutta T.; Sun J.; Simmons B.; Singh S., Supplemental Material Biomass Pretreatment Using Deep Eutectic Solvent From Lignin Derived Phenols. *ResearchGate* 2018, available at http://www.rsc.org/suppdata/c7/gc/c7gc03029k/c7gc03029k1.pdf (retrieved Oct. 26, 2020).

What is claimed is:

1. A method for synthesizing a hydrophobic deep eutectic solvent, comprising:
    mixing a first compound with a second compound to create a mixture;
    heating the mixture; and
    stirring the mixture until a homogenous liquid is obtained;
    wherein the first compound and the second compound are not the same compound;
    wherein the first compound is menthol, thymol, decanoic acid, or 2,6-dimethoxyphenol; and
    wherein the second compound is 2,6-dimethoxyphenol, phenol, 1-pheylethanol, guaiacol, vanillin, or 4-hydroxybenzyl alcohol.

2. The method according to claim 1, wherein the first compound and the second compound are each phenolic.

3. The method according to claim 1, wherein heating the mixture comprises increasing the temperature of the mixture to a value within a range of about 60° C. to about 100° C.

4. The method according to claim 1, wherein the first compound is menthol and the second compound is 2,6-dimethoxyphenol.

5. The method according to claim 1, wherein the first compound is menthol and the second compound is phenol.

6. The method according to claim 1, wherein the first compound is menthol, and the second compound is 1-phenylethanol.

7. The method according to claim 1, wherein the first compound is menthol and the second compound is guaiacol.

8. The method according to claim 1, wherein the first compound is thymol and the second compound is vanillin.

9. The method according to claim 1, wherein the first compound is thymol and the second compound is 2,6-dimethoxyphenol.

10. The method according to claim 1, wherein the first compound is thymol and the second compound is phenol.

11. The method according to claim 1, wherein the first compound is thymol and the second compound is guaiacol.

12. The method according to claim 1, wherein the first compound is decanoic acid and the second compound is 2,6-dimethoxyphenol.

13. The method according to claim 1, wherein the first compound is decanoic acid and the second compound is phenol.

14. The method according to claim 1, wherein the first compound is decanoic acid and the second compound is guaiacol.

15. The method according to claim 1, wherein the first compound is decanoic acid and the second compound is 1-phenylethanol.

16. The method according to claim 1, wherein the first compound is 2,6-dimethoxyphenol and the second compound is 4-hydroxybenzyl alcohol.

17. The method according to claim 1, wherein the first compound is 2,6-dimethoxyphenol and the second compound is vanillin.

18. The method according to claim 1, wherein the first compound is 2,6-dimethoxyphenol and the second compound is phenol.

19. The method of claim 1, wherein the first compound and the second compound are mixed in a molar ratio of 1:1, 1:2, 2:1, 3:1, 4:1, or 5:1.

\* \* \* \* \*